United States Patent
Leslie

(10) Patent No.: US 12,184,681 B2
(45) Date of Patent: Dec. 31, 2024

(54) CYBERATTACK DETECTION WITH TOPOLOGICAL DATA

(71) Applicant: Raytheon Company, Tewksbury, MA (US)

(72) Inventor: Nandi O. Leslie, Silver Spring, MD (US)

(73) Assignee: Raytheon Company, Tewksbury, MA (US)

( * ) Notice: Subject to any disclaimer, the term of this patent is extended or adjusted under 35 U.S.C. 154(b) by 124 days.

(21) Appl. No.: 17/844,429

(22) Filed: Jun. 20, 2022

(65) Prior Publication Data
US 2023/0412623 A1 Dec. 21, 2023

(51) Int. Cl.
*H04L 29/06* (2006.01)
*H04L 9/40* (2022.01)

(52) U.S. Cl.
CPC ...... *H04L 63/1425* (2013.01); *H04L 63/1458* (2013.01)

(58) Field of Classification Search
CPC ............ H04L 63/1425; H04L 63/1458; H04L 2463/144
See application file for complete search history.

(56) References Cited

U.S. PATENT DOCUMENTS

| | | | |
|---|---|---|---|
| 10,972,495 B2 * | 4/2021 | Berlin | G06F 21/56 |
| 11,075,934 B1 * | 7/2021 | Aldhaheri | G06N 3/048 |
| 11,308,738 B2 * | 4/2022 | Thomas | G07C 5/0825 |
| 11,410,055 B2 * | 8/2022 | Tsunoda | G06N 20/00 |
| 11,797,360 B2 * | 10/2023 | Han | G06F 11/079 |
| 2020/0204569 A1 * | 6/2020 | Komarek | G06N 20/00 |
| 2021/0014252 A1 * | 1/2021 | Usher | H04L 63/1416 |
| 2023/0105087 A1 * | 4/2023 | Borges | H04L 63/1425 726/23 |
| 2023/0379350 A1 * | 11/2023 | Barton | H04L 63/1416 |

OTHER PUBLICATIONS

Davies, Thomas. "A Review of Topological Data Analysis for Cybersecurity." arXiv preprint arXiv:2202.08037 (2022). (Year: 2022).*
Carlsson, Gunnar, et al., "Topological Approaches to Deep Learning", arXiv:1811.01122, (Nov. 2018), 23 pgs.
(Continued)

*Primary Examiner* — Ka Shan Choy
(74) *Attorney, Agent, or Firm* — Schwegman Lundberg & Woessner, P.A.

(57) ABSTRACT

Discussed herein are devices, systems, and methods for detecting anomalous or malicious processes based on a network flow data. A method for network intrusion detection, the method comprising receiving a network flow data, implementing a topological data analysis (TDA) algorithm to identify respective birth and death of homological classes to which the network flow data maps, appending the respective (birth, death) pairs along with additional TDA-based features to a feature space resulting in an augmented feature (Continued)

space, and determining, using a machine learning algorithm the operates on the augmented feature space as input, whether the network flow data is associated with a network intrusion.

20 Claims, 5 Drawing Sheets

(56) References Cited

OTHER PUBLICATIONS

Carlsson, Gunnar, et al., "Topological Data Analysis and Machine Learning Theory", Retrieved online. URL: <https://datascienceassn.org/sites/default/files/Topological%20Data%20Analysis%20and%20Machine%20Learning%20Theory.pdf>, (Oct. 2012), 11 pgs.

Khasawneh, Firas A., et al., "Chatter Classification in Turning using Machine Learning and Topological Data Analysis", IFAC PapersOnLine 51-14 (2018), 195-200.

Perea, Jose A., "A Brief History of Persistence", arXiv:1809.03624v2, (Oct. 2018), 11 pgs.

Sharafaldin, Iman, et al., "Toward Generating a New Intrusion Detection Dataset and Intrusion Traffic Characterization", Proceedings of the 4th International Conference on Information Systems Security and Privacy (ICISSP 2018), 108-116.

Van Veen, Hendrik Jacob, et al., "Kepler Mapper: A flexible Python implementation of the Mapper algorithm", Journal of Open Source Software, 4(42), (2019), 3 pgs.

Carlsson, Gunnar, "Topological Data Analysis and Machine Learning Theory", Retrieved online. URL: https:datascienceassn.org sites default files Topological%20Data%20Analysis%20and%20Machine%20Learning%20Theory.pdf, (Oct. 2012), 11 pgs.

Carlsson, Gunnar, "Topological Approaches to Deep Learning", arXiv:1811.01122, (Nov. 2018), 23 pgs.

Khasawneh, Firas A., "Chatter Classification in Turning using Machine Learning and Topological Data Analysis", IFAC PapersOnLine 51-14 (2018), 195-200.

Sharafaldin, Iman, "Toward Generating a New Intrusion Detection Dataset and Intrusion Traffic Characterization", Proceedings of the 4th International Conference on Information Systems Security and Privacy (ICISSP 2018), 108-116.

Van Veen, Hendrik Jacob, "Kepler Mapper: A flexible Python implementation of the Mapper algorithm", Journal of Open Source Software, 4(42), (2019), 3 pgs.

\* cited by examiner

CYBERATTACK DETECTION WITH TOPOLOGICAL DATA

TECHNICAL FIELD

Embodiments discussed herein regard devices, systems, and methods for detecting cyberattacks.

BACKGROUND

For nearly forty (40) years, computer scientists and engineers have been concerned with the problem of monitoring networks for unauthorized activities. More recently, anomaly-based intrusion detection systems (IDS) have been developed to protect enterprise and mobile networks from such attacks. Nonetheless, networks remain vulnerable to a variety of remote attacks that erode information confidentiality, availability, and integrity. Such intrusions are considered cyberattacks.

DETAILED DESCRIPTION

Figure 1:
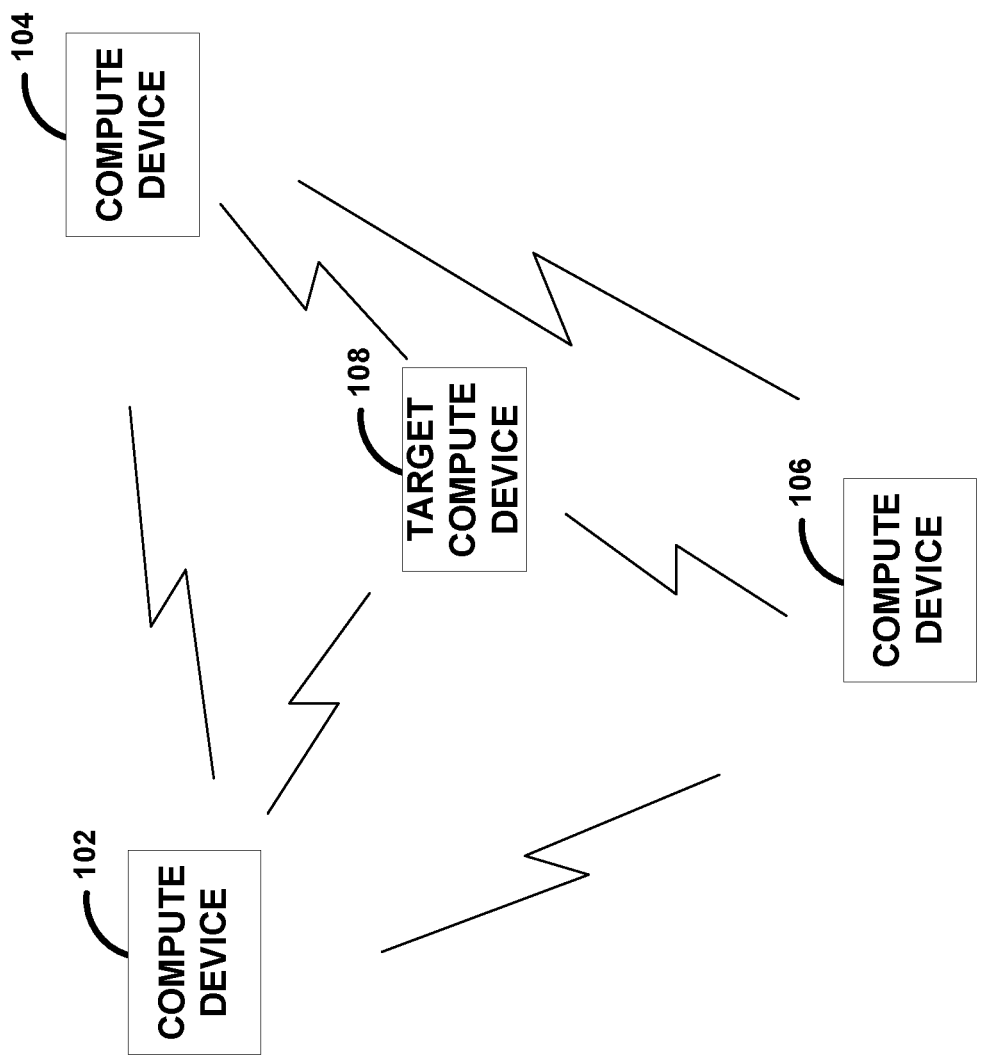
FIG. 1 illustrates, by way of example, a block diagram of an embodiment of a network suffering from a network intrusion.

Embodiments provide systems, methods, devices, and computer-readable media that use a topological approach to detect a cyberattack. Embodiments use topological data analysis (TDA) combined with machine learning (ML) for detecting the cyberattack. TDA clusters data points in a feature space. The topological features provide information about the shape formed by the given network sessions data comprised of packet header details. The d-dimensional homology groups of simplicial complexes formed in the feature space measure the "shape" of the data—for example, the 0-dimensional homology describes clusters (or connected components), 1-dimensional homology describes loops, and 2-dimensional homology measures voids. Formally, the p-th homology group is the quotient group $H_p = Z_p / B_p$, where $p \geq 0$, $H_p$ is a vector space, using the field $\mathbb{Z}_2$ for coefficients. In addition, its dimension is the p-th Betti number, denoted by $\beta_p$.

This geometric information, such as the Betti numbers $\beta_i$, where $\beta_1$ is the number of clusters, and $\beta_p$ is the number of n-dimensional holes, can be appended to the feature space as a feature vector. This topological data can include an identifier for the d-dimensional homology, and information from the persistent homology, such as the persistence diagram, including the birth and death of simplices in a filtration as the parameter changes. The feature vector with this appended topological data is called an enhanced feature vector herein. The enhanced feature vector can be input into a classifier or clustering algorithm that determines whether the network flow data corresponds to a benign, malicious, or even a type of malicious activity.

A data flow is metadata about network traffic traversing a network device, such as a router, switch, or host. Data flow metadata is data about the packets that comprise the network traffic traversing the network device. Network metadata carries individual traits pertaining to the structure and contents of network protocols and packets. Metadata includes telemetry of network connections and the artifacts associated with these connections. Data flow is contrasted with network packet capture. Network packet capture contains full detail of the network traffic. Network packet capture is more onerous than data flow capture in terms of data processing and storage.

The data flow can be metadata at any of the open systems interconnections (OSI) model layers. Typically, the metadata regards traffic on one or more of layers 3-7 of the OSI model (the application layer, presentation layer, session layer, transport layer, and network layer.

A flow is a unidirectional sequence of packets that share common values in corresponding entries. In the example of Cisco NetFlow packets of a flow share an ingress interface, source internet protocol (IP) address, destination IP address, IP protocol, source port, destination port, and IP type of service. IPv6, multi-protocol label switching (MPLS), and Ethernet flows can be defined in a similar manner.

Common metadata included in a packet includes an input interface index (e.g., used by simple networking management protocol (SNMP)), an output interface index (zero if the packet is dropped), timestamps for flow start and finish times (e.g., typically in milliseconds), number of bytes and packets observed in the flow, layer 3 headers, such as source and destination IP address, internet control message protocol (ICMP) type and code, IP protocol, type of service value, or a combination thereof, source and destination port numbers for TCP, unigram data protocol (UDP), SCTP, or the like, union of all TCP flags observed over the life of the flow, layer 3 routing information, such as IP address of the immediate next-hop along the route to the destination, source and destination IP masks, or a combination thereof, among others.

Embodiments can pre-process a network flow data by converting categorical features to numerical features, such as with a one-hot encoding algorithm. Embodiments can then perform feature normalization such that the features have zero mean and unit standard deviation. Subsequently, embodiments can reduce feature space dimensionality with Principal Component Analysis (PCA), while maintaining the minimum number of principal components that explains at least 99% of the variance.

Embodiments develop simplicial complexes from the observations in the feature space constructed from the network traffic data which constitutes a point cloud. From these observations in the point cloud, the embodiment constructs a simplicial complex, namely a Vietoris-Rips complex (or Rips complex) formed by placing a ball of radius $\in \geq 0$ around each point and taking the pairwise intersection. In other words, the embodiment forms an edge between any two points, x, y within a given distance $\in \geq 0$, such that $d(x, y) \leq \in$, and by including the simplex if the complex has all the possible edges. Distance between points can be determined in a number of ways. Example distance metrics to determine distance include $L_p$ distance (e.g., Euclidean or $L_2$ distance), cosine distance, Minkowski, among other distances.

Embodiments measure certain topological structures emerging from the simplicial complex, including the filtration, a nested sequence of simplicial complexes. The boundary of a simplex is a cycle, and the singular homology group of a topological space classifies the cycles by combining the cycles that differ by a boundary. For this work, the primary goal of examining the homology groups in the feature space is to identify the n-dimensional "holes" in the dataset (e.g., clusters, loops, voids). The $i^{th}$ Betti number, $\beta_i$, is the rank of the i-dimensional singular homology group of a topological space. A geometric interpretation for $\beta_0$ is the number of isolated connected components or clusters, $\beta_1$ is the number of one-dimensional cycles, and $\beta_2$ is the number of 2-dimensional holes.

Subsequently, embodiments can append the results from the topological analysis to the reduced feature vector. The results from the topological analysis can inform a classifier as to the shape of a group the data flow was mapped to per distance. The classifier can then operate based on the enhanced vector (the reduced feature vector with the topological analysis results appended thereto) for the data flow.

The following aspects of the anomaly-based IDS algorithm for cyberattacks are example advantages of embodiments:
  i. A topological enhancement to feature vectors can help improve cyberattack detection
  ii. The topological enhancement to feature vectors can help identify a denial of service (DoS), distributed DoS (DDoS), brute force, structured query language (SQL) injection, infiltration, port scan, Botnet, or other cyberattack.

Embodiments will now be described with reference to the FIGS.

FIG. 1 illustrates, by way of example, a block diagram of an embodiment of a network intrusion. The network intrusion includes a compute device 102, 104, 106 communicatively coupled to each other and a target compute device 108. An intruder can have a goal of co-opting, retrieving data from, of having a user of the target device 108 performing an operation. The operation can include opening a file, executing a program, visiting a website, connecting to another device, such as the compute device 102, 104, 106, or the like. The operation can benefit the intruder or can be a part of a scheme to help the user. The operation is a network intrusion, and it is a goal of embodiments to detect this network intrusion.

Types of network intrusions include a botnet, denial of service (DoS) (e.g., distributed denial of service (DDoS)), internet relay chat (IRC), web attack, port scan, bot, brute force, infiltration, or the like. A botnet is a network of compute devices infected with malicious software and controlled as a group without permission from the owners of the compute devices. A DoS occurs when legitimate users are unable to access network resources (e.g., information, devices, systems, or the like) due to the actions of the intruder. IRC is a text-based system for instant messaging (IM). IRC is designed for group communication in discussion forums. IRC can be exploited using packet sniffing, such as to retrieve credentials of the user in a takeover war. A web attack targets vulnerabilities in a website to gain unauthorized access, obtain confidential information, introduce malicious content, or alter content of the website. A port scan is a method for determining which ports of a network are open for communication. Brute force is a hacking method that uses trial and error to find a valid password or other login credentials, encryption keys, or the like. Infiltration is an unauthorized entry of program code into a computer to perform an operation. The operation is often concealed and not desired by the owner of the device that is performing the operation.

The network of FIG. 1 does not support any security features intrinsically. In most implementations, applications are expected to deploy their own security mechanisms. Failure to implement adequate security measures may result in various sorts of attacks by the intruder.

To help provide security for such vulnerabilities, embodiments include a monitor 200 (see FIG. 2) that receives network flow data 220 (see FIG. 2) and determines whether the packets 220 are related to anomalous or benign behavior. The monitor 200 can be implemented using software, hardware, firmware, or combination thereof. The monitor 200 can include electric or electronic components organized, electrically coupled, or otherwise configured to perform operations of the monitor 200. The electric or electronic components can include one or more transistors, resistors, capacitors, diodes, inductors, switches, oscillators, logic gates (AND, OR, XOR, negate, buffer, or the like), multiplexers, amplifiers, power supplies, memory devices, processor devices [e.g., central processing units (CPUs), graphics processing units (GPUs), field programmable gate arrays, application specific integrated circuits], power supplies, analog to digital converters, digital to analog converters, regulators, converters, inverters, or the like. The monitor 200 can perform the operations of method 400 of FIG. 4.

Figure 2:
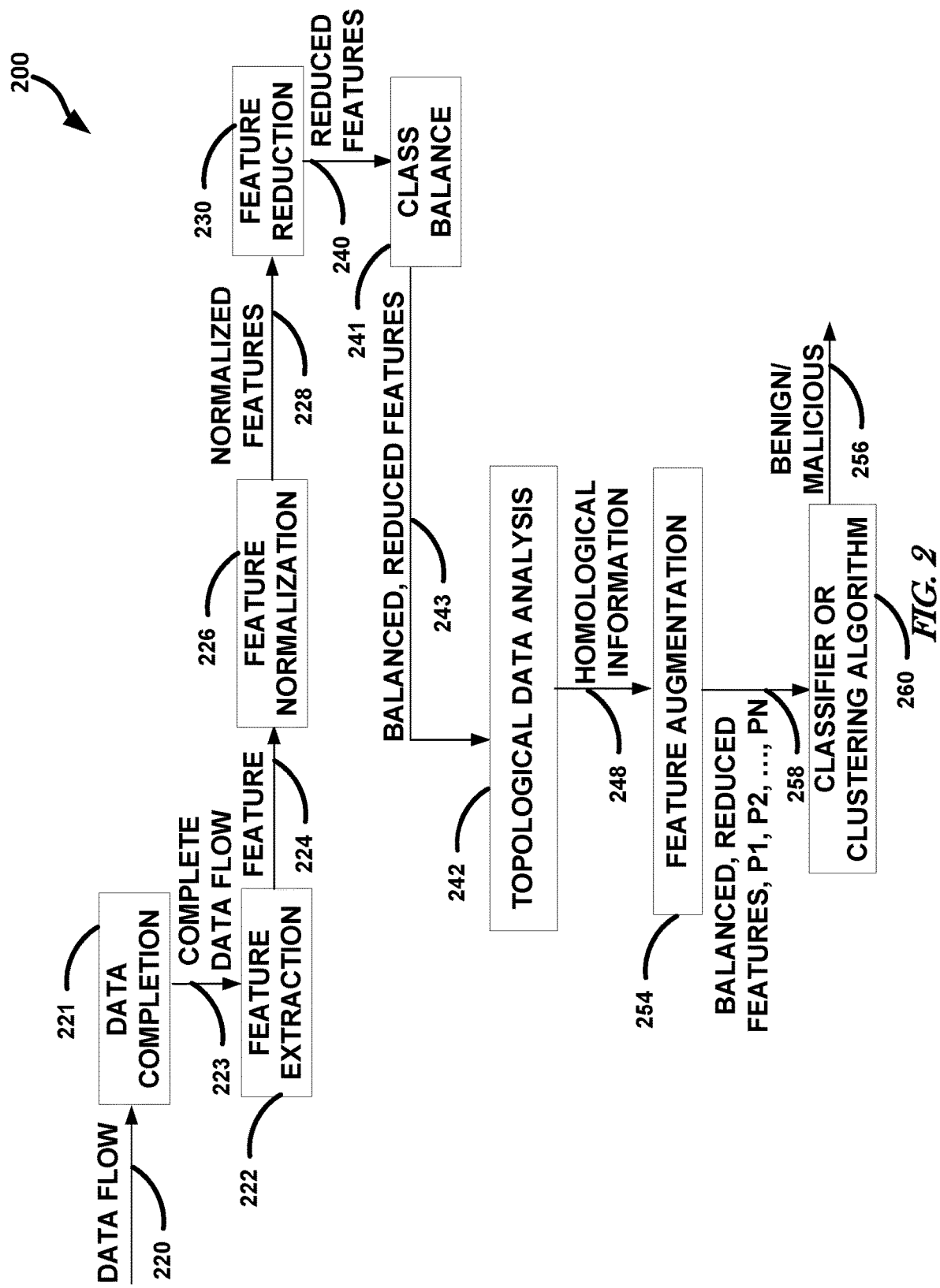
FIG. 2 illustrates, by way of example, a flow diagram of an embodiment of a monitor for network intrusion detection.

FIG. 2 illustrates, by way of example, a flow diagram of an embodiment of a monitor 200 for network intrusion detection. The monitor 200 as illustrated receives a network flow data 220. The network flow data 220 can include an input interface index (e.g., used by simple network management protocol (SNMP)), an output interface index (zero if the packet is dropped), timestamps for flow start and finish times (e.g., typically in milliseconds), number of bytes and packets observed in the flow, layer 3 headers, such as source and destination IP address, ICMP type and code, IP protocol, type of service value, or a combination thereof, source and destination port numbers for TCP, UDP, SCTP, or the like, union of all TCP flags observed over the life of the flow, layer 3 routing information, such as IP address of the immediate next-hop along the route to the destination, source and destination IP masks, or a combination thereof, among others.

Sometimes the network flow data 220 is incomplete. Operation 221 can complete the data packet 220 to generate a complete data flow 223. A topological algorithm 242, operates on data with respective features. If a feature is not present or has an unintelligible value (unintelligible to the topological algorithm 242), the topological algorithm 242 can operate to produce inaccurate results. The operation 221 operates to allow the topological algorithms 242 to operate accurately. The data completion operation 221 can include altering text to numerical values, such as by using a one-hot encoding, word2vec, GloVe, or the like. The data completion operation 221 can include replacing a missing entry or a not a number entry with a zero. The data completion operation 221 can include using a statistical technique to determine a missing value (e.g., a zero value or an empty field or the like). Example statistical techniques can include multiple imputation by chained equations (MICE), imputation using an average value (e.g., mean, median, mode, etc.), imputation using most frequent value or zero values, imputation using a ML model (e.g., k-means clustering, deep learning (DL)), stochastic regression, extrapolation, interpolation, hot-deck imputation, or the like.

Feature extraction can be performed at operation 222. The operation 222 can include identifying information in the network flow data 220 that can be relevant to a determination of whether the data packet is malicious or benign. The extracted features can include individual entries of the network flow data 220. The operation 222 produces features 224. The features 224 are numeric values that represent the state of the condition being monitored by the monitor 200.

The features 224 can be normalized at operation 226. Feature normalization maps feature values in a first range to feature values in a different, second range. The second range can be [0, 1] or other range. The operation 226 results in a normalized feature 228. At operation 230, the features can be reduced. There are various techniques for feature dimensionality reduction in the feature space including PCA, independent component analysis, linear discriminant analysis, among others. Dimensionality reduction can reduce training time, can help avoid overfitting, can aid data visualization, compress the data, and can even transform nonlinear data to linearly separable data.

The result of dimensionality reduction using the operation 230 is reduced features 240. The reduce features 240 can be provided to a class balance operation 241. The class balance operation 241 can include oversampling minority examples based on results of a clustering technique. The class balance operation 241 can include a synthetic minority oversampling technique (SMOTE). For example, using the operation 241, the reduced features 240 can be clustered and the clusters with fewer data flows mapped thereto can be oversampled (duplicated and added to the training set). This balances the class distribution but does not provide any additional information to the model. A result of the operation 241 is balanced, reduced features 243.

The balanced, reduced features 243 can be input to a plurality of topological analysis algorithm 242. The number of topological analysis algorithm 242 is variable and can be an integer number greater than one (1). Each of the topological analysis algorithm 242 can operate based on different distances, difference distance metrics, or a combination thereof. A linkage function determines the distance between balanced reduced features 243. A metric or pairwise distance between balanced, reduced features 243 can include $L_p$ distance, cosine, maximum, Mahalanobis, among others. Ultimately, the distance can alter a shape generated by the simplicial complexes.

The topological algorithm 242 is an approach to examining the shapes (e.g., connected components, d-dimensional voids) formed by the observations in the feature space (the space of the reduced features 240 or the features 224 in this case). A distance is defined. To measure a d-dimensional homology, for each observation that is within some defined distance of another observation, an edge (or higher dimensional simplex) is defined between the observations. For various distances, as measured by a given distance metric, the observations and edges between observations form d-dimensional simplices. For example, a 0-dimensional simplex is a vertex, a 1-dimensional simplex is an edge, and a 2-dimensional simplex is a triangle. Topological algorithm 242 can determine the simplicial complexes formed for different distances. The distance or parameter can be incremented from smaller to larger or larger to smaller and the corresponding persistent homology information 248 can be recorded. Each of the TDA algorithms 242 can operate using a different one of the distance increments. The corresponding homological information can inform features that are added to the balanced, reduced feature 243 by a feature augmentation operation 254.

The different topological algorithms 242 can each produce respective homological information 248 regarding a shape of a group of data packets connected to the data packet 220 based on the distance. The homological information 248 can indicate a (birth, death) pair of each d-dimensional homology formed by the observations and the parameter that was used to determine the (birth, death) pair. The homological information 248 can be aggregated into a persistence diagram. A persistence diagram is a visual representation that shows, at what scale (distance) are changes observed in a representation of the data. The changes can be to a homology (e.g., zero dimensional, one dimensional, or more dimensions (some positive integer)) persisting in the representation of the data across a range of diameters. A point in the persistence diagram represents a (birth, death) diameter pair of a d-dimensional homology class in the Rips complex, for example. An aggregation of the (birth, death) diameters forms the persistence diagram. The resulting (birth, death) pair points and the distances between them on the persistence diagram give some information on the nature of the action associated with the network flow data 220. Specifically, a persistence diagram $\text{Dgm}_p(\mathcal{F}_f)$ of a filtration $\mathcal{F}_f$ consists of points $(a_i, a_j)$ with nonzero multiplicity $\mu_p^{i,j}$, $i<j$ on the extended plane $(\mathbb{R}\cup\{\pm\infty\})^2$, where points on the diagonal are added with infinite multiplicity, and $\mu_p^{i,j}$ is the number of independent p-dimensional homology classes born at $a_i$ and dying at $a_j$. Early (lower distance) (birth, death) pair points can be due to noise, while later (higher distance) (birth, death) pair points can be due to the network flow data corresponding to different actions. Thus, providing the (birth, death) pair points as an observation in a feature vector can help inform how a classifier or clustering algorithm identifies the network flow data 220 (as a cyberattack or benign). A persistent homology offers a measure of cluster robustness in the separation of values on the persistence diagram.

The operation 254 can include appending the homological information 248 to the balanced, reduced features 243. The resulting vector is used as the feature vector 258 for a classifier 260. For example, assume the balanced, reduced features 240 are $\{F_1, F_2, \ldots, F_M\}$ and the homological information 248 is $\{P_1, P_2, \ldots, P_N\}$. The resulting features 258 produced by the operation 254 can be the feature vector $\{F_1, F_2, \ldots, F_M, P_1, P_2, \ldots, P_N\}$.

The classifier 260 can generate an output classification 256 indicating whether the network flow data 220 is benign or malicious based on the homological information 248 and the balanced, reduced features 243. The classifier 260 can operate use supervised learning, unsupervised learning, reinforcement learning, semi-supervised learning, or the like to classify or cluster the augmented features 258. More specifically, the classifier or clustering algorithm 260 can determine whether the observation is benign or malicious 256. For example, the ML algorithm 260 can be a classifier (e.g., deep learning (DL) or logistic regression, or a clustering algorithm 260 can use, such as K-means or hierarchical clustering, to determine whether the data is a cyberattack.

Figure 3:
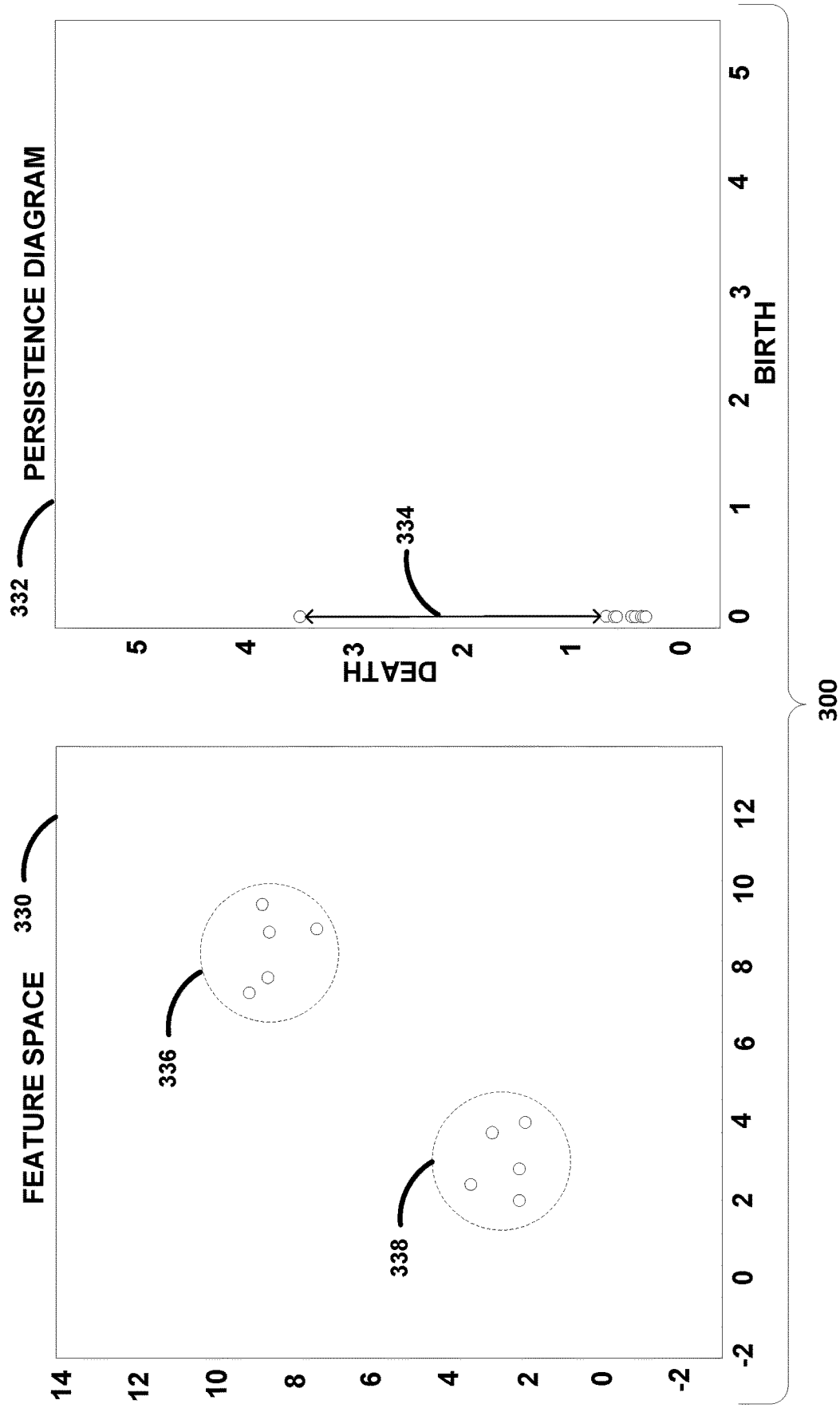
FIG. 3 illustrates, by way of example, graphs of a feature space and a persistence diagram of a zero-dimensional homology corresponding to the feature space.

FIG. 3 illustrates, by way of example, graphs 300 of a feature space 330 and a corresponding zero-dimensional persistence diagram 332. The feature space 330 in this example is two-dimensional, but can have, and typically does have, a higher dimensional feature space. Each of the circles in the feature space 330 represents a different network session 220. The network flow data 220 are mapped by operations 221, 222, 226, 230, 241, or a combination thereof, to the feature space 330. Then, the embodiment builds a Rips complex for multiple parameters a distance is initialized (typically to zero). This distance makes all points in the feature space 330 that are uniquely mapped (there is no other network flow data that is mapped to the exact same point) have a birth at 0 and no death yet. Then the distance is increased and any points that are within that distance of each other are "combined" to represent a new entity different from the point. All but one of the points that is part of the new entity is deemed to have a "death" and a point that corresponds to the (birth distance, death distance) is placed on the persistence diagram. The birth distance of the new entity is the birth distance of the point that is not deemed to have a death. In the example of the persistence diagram 332, the first death is realized at a distance of about 0.33. Eventually, the points form two clusters 336 and 338 and there are many increments of the distance that do not realize a death or birth (indicated by double arrow 334). Any of the deaths realized before the lower arrow (lower meaning the arrow of the double arrow 334 corresponding to the smaller distance) of the double arrow 334 can be considered noise. The death realized after the lower arrow can correspond to a difference in class or nature of the network flow data 220.

Figure 4:
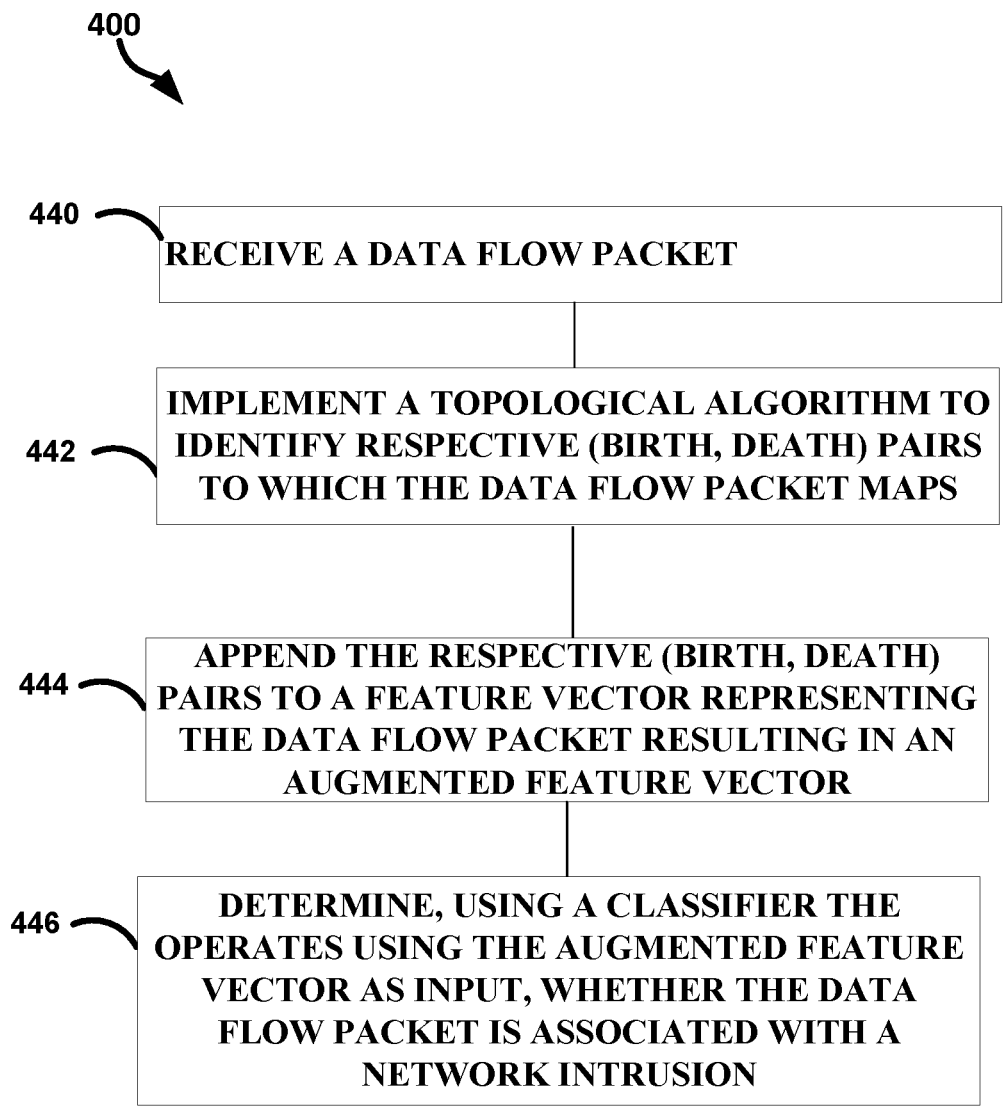
FIG. 4 illustrates, by way of example, a block diagram of an embodiment of a method for network intrusion detection.

FIG. 4 illustrates, by way of example, a block diagram of an embodiment of a method 400 for network intrusion detection. The method 400 as illustrated includes receiving a network flow data, at operation 440; implementing a topological algorithm to identify respective (birth, death) pairs to which the network flow data maps, at operation 442; appending the respective (birth, death) pairs to a feature vector representing the network flow data resulting in an augmented feature vector, at operation 444; and determining, using a classifier that operates using the augmented feature vector as input, whether the network flow data is associated with a network intrusion, at operation 446.

The method 400 can further include, wherein the network intrusion includes a botnet, denial of service (DoS), distributed DoS (DDoS), brute force, structured query language (SQL) injection, infiltration, or port scan. The method 400 can further include, wherein the classifier is a clustering classifier that clusters the augmented feature vectors into groups including a first group corresponding to a benign network flow data and a second group corresponding to a malicious network flow data. The method 400 can further include, wherein the ML algorithm performs K-means clustering or k-nearest neighbors (k-NN) classification. The method 400 can further include, wherein the classifier is a multilayer perceptron (MLP).

The method 400 can further include, wherein data of the network flow data includes three or more of an input interface index, an output interface index, timestamps for flow start and finish times, number of bytes and packets observed in a corresponding flow, source and destination internet protocol (IP) address, internet control message protocol (ICMP) type and code, IP protocol, type of service value, source and destination port numbers for transmission control protocol (TCP), unigram data protocol (UDP), or stream control transmission protocol (SCTP), union of all TCP flags observed over a life of the flow, IP address of an immediate next-hop along a route to a destination, or source and destination IP masks. The method 400 can further include, wherein the operations further comprise extracting features of the network flow data, and wherein the topological algorithm operates on the extracted features to generate a persistence diagram for the network flow data along with other network flow data. The method 400 can further include, before extracting the features, completing the network flow data to alter text to numerical values and fill-in any empty fields of the network flow data. The method 400 can further include, after completing the network flow data, balancing a number of samples of each class in network flow data including the network flow data.

Figure 5:
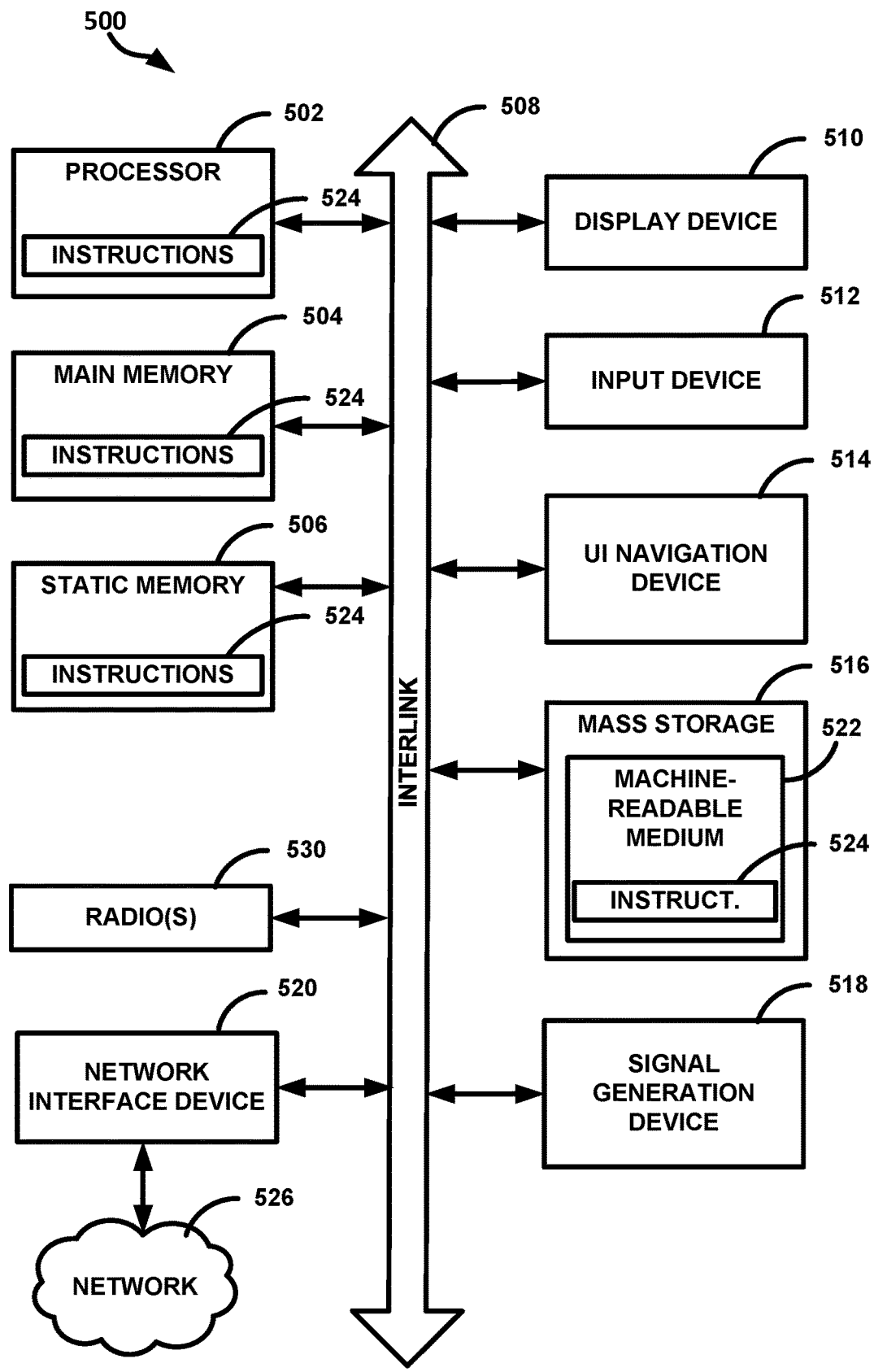
FIG. 5 illustrates, by way of example, a block diagram of an embodiment of a machine in the example form of a computer system within which instructions, for causing the machine to perform any one or more of the methodologies discussed herein, may be executed.

FIG. 5 illustrates, by way of example, a block diagram of an embodiment of a machine in the example form of a computer system 500 within which instructions, for causing the machine to perform any one or more of the methodologies discussed herein, may be executed. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., CPU, GPU), a main memory 504 and a static memory 506, which communicate with each other via a bus 508. The computer system 500 may further include a video display unit 510 (e.g., liquid crystal display, cathode ray tube). The computer system 500 also includes an alphanumeric input device 512 (e.g., keyboard), a user interface navigation device 514 (e.g., mouse), a mass storage unit 516, a signal generation device 518 (e.g., speaker), a network interface device 520, and a radio 530 such as Bluetooth, WWAN, WLAN, and NFC, permitting the application of security controls on such protocols.

The mass storage unit 516 includes a machine-readable medium 522 on which is stored one or more sets of instructions and data structures (e.g., software) 524 embodying or utilized by any one or more of the methodologies or functions described herein. The instructions 524 may also reside, completely or at least partially, within the main memory 504 and/or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 524 may further be transmitted or received over a communications network 526 using a transmission medium. The instructions 524 may be transmitted using the network interface device 520 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMAX networks). The term "transmission medium" shall be taken to include any intangible medium that is capable of storing, encoding, or carrying instructions for execution by the machine, and includes digital or analog communications signals or other intangible media to facilitate communication of such software.

ADDITIONAL NOTES AND EXAMPLES

Example 1 includes a device of a network, the device comprising at least one memory including instructions stored thereon, and processing circuitry configured to execute the instructions, the instructions, when executed, cause the processing circuitry to perform operations comprising receiving a network flow data, implementing a TDA algorithm for building a persistence diagram to identify respective (birth, death) diameter pairs to which the network flow data maps, appending the respective (birth, death) pairs to a feature vector representing the network flow data resulting in an augmented feature vector, and determining, using a classifier that operates using the augmented feature vector as input, whether the network flow data is associated with a network intrusion.

In Example 2, Example 1 further includes, wherein the network intrusion includes a botnet, denial of service (DoS), distributed DoS (DDoS), brute force, structured query language (SQL) injection, infiltration, or port scan.

In Example 3, at least one of Examples 1-2 further includes, wherein the classifier is a clustering classifier that clusters the augmented feature vectors into groups including a first group corresponding to a benign network flow data and a second group corresponding to a malicious network flow data.

In Example 4, at least one of Examples 1-3 further includes, wherein the classifier performs k-means clustering or k-nearest neighbors (NN) clustering.

In Example 5, at least one of Examples 1-4 further includes, wherein the classifier is a multilayer perceptron (MLP).

In Example 6, at least one of Examples 1-5 further includes, wherein data of the network flow data includes three or more of an input interface index, an output interface index, timestamps for flow start and finish times, number of bytes and packets observed in a corresponding flow, source and destination internet protocol (IP) address, internet control message protocol (ICMP) type and code, IP protocol, type of service value, source and destination port numbers for transmission control protocol (TCP), unigram data protocol (UDP), or stream control transmission protocol (SCTP), union of all TCP flags observed over a life of the flow, IP address of an immediate next-hop along a route to a destination, or source and destination IP masks.

In Example 7, example 6 further includes extracting features of the network flow data, and wherein the topological algorithm operates on the extracted features to generate a persistence diagram for the network flow data along with other network flow data.

In Example 8, Example 7 further includes, before extracting the features, completing the network flow data to alter text to numerical values and fill-in any empty fields of the network flow data.

In Example 9, at least one of Examples 1-8 further includes, after completing the network flow data, balancing a number of samples of each class in network flow data including the network flow data.

Example 10 includes a method of performing operations of one of Examples 1-9.

Example 11 includes a non-transitory machine-readable medium including instructions that, when executed by a machine, cause the machine to perform operations of one of Examples 1-9.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A device of a computer network, the device comprising:
   at least one memory including instructions stored thereon; and
   processing circuitry configured to execute the instructions, the instructions, when executed, cause the processing circuitry to perform operations comprising:
   receiving a network flow data;
   identifying, by a topological algorithm, respective (birth, death) pairs to which the network flow data maps;
   appending the respective (birth, death) pairs to a feature vector representing the network flow data resulting in an augmented feature vector; and
   determining, using a classifier that operates using the augmented feature vector as input, whether the network flow data is associated with a network intrusion.

2. The device of claim 1, wherein the network intrusion includes a botnet, denial of service (DoS), distributed DoS (DDoS), brute force, structured query language (SQL) injection, infiltration, or port scan.

3. The device of claim 1, wherein the classifier is a clustering classifier that clusters the augmented feature vectors into groups including a first group corresponding to a benign network flow data and a second group corresponding to a malicious network flow data.

4. The device of claim 1, wherein the classifier performs K-means clustering or k-nearest neighbors (k-NN) clustering.

5. The device of claim 1, wherein the classifier is a multilayer perceptron (MLP).

6. The device of claim 1, wherein data of the network flow data includes three or more of an input interface index, an output interface index, timestamps for flow start and finish times, number of bytes and packets observed in a corresponding flow, source and destination internet protocol (IP) address, internet control message protocol (ICMP) type and code, IP protocol, type of service value, source and destination port numbers for transmission control protocol (TCP), unigram data protocol (UDP), or stream control transmission protocol (SCTP), union of all TCP flags observed over a life of the flow, IP address of an immediate next-hop along a route to a destination, or source and destination IP masks.

7. The device of claim 6, wherein the operations further comprise:
   extracting features of the network flow data; and
   wherein the topological algorithm operates on the extracted features to generate a persistence diagram for the network flow data along with other network flow data.

8. The device of claim 7, further comprising, before extracting the features, completing the network flow data to alter text to numerical values and fill-in any empty fields of the network flow data.

9. The device of claim 8, further comprising, after completing the network flow data, balancing a number of samples of each class in network flow data including the network flow data.

10. A non-transitory machine-readable medium including instructions that, when executed by a machine, cause the machine to perform operations for network intrusion detection, the operations comprising:
    receiving a network flow data;
    identifying, by a topological algorithm, respective (birth, death) diameter pairs to which the network flow data maps;
    appending the respective (birth, death) pairs and other topological features, including an identifier for each d-dimensional simplex formed for a given parameter to a feature vector representing the network flow data resulting in an augmented feature vector; and
    determining, using a classifier or clustering algorithm that operates using the augmented feature vector as input, whether the network flow data is associated with a network intrusion.

11. The non-transitory machine-readable medium of claim 10, wherein the network intrusion includes a botnet, denial of service (DoS), distributed DoS (DDoS), brute force, structured query language (SQL) injection, infiltration, or port scan.

12. The non-transitory machine-readable medium of claim 10, wherein the classifier is a clustering classifier that clusters the augmented feature vectors into groups including a first group corresponding to a benign network flow data and a second group corresponding to a malicious network flow data.

13. The non-transitory machine-readable medium of claim 10, wherein the classifier performs k-means clustering or k-nearest neighbors (k-NN) clustering.

14. The non-transitory machine-readable medium of claim 10, wherein the classifier is a multilayer perceptron (MLP).

15. A method for network intrusion detection, the method comprising:
    receiving a network flow data;
    identifying, by a topological algorithm, respective (birth, death) pairs to which the network flow data maps;
    appending the respective (birth, death) pairs to a feature vector representing the network flow data resulting in an augmented feature vector; and
    determining, using a classifier or clustering algorithm that operates using the augmented feature vector as input, whether the network flow data is associated with a network intrusion.

16. The method of claim 15, wherein data of the network flow data includes three or more of an input interface index, an output interface index, timestamps for flow start and finish times, number of bytes and packets observed in a corresponding flow, source and destination internet protocol (IP) address, internet control message protocol (ICMP) type and code, IP protocol, type of service value, source and destination port numbers for transmission control protocol (TCP), unigram data protocol (UDP), or stream control transmission protocol (SCTP), union of all TCP flags observed over a life of the flow, IP address of an immediate next-hop along a route to a destination, or source and destination IP masks.

17. The method of claim 16, wherein the operations further comprise:
    extracting features of the network flow data; and
    wherein the topological algorithm operates on the extracted features to generate a persistence diagram for the network flow data along with other network flow data.

18. The method of claim 17, further comprising, before extracting the features, completing the network flow data to alter text to numerical values and fill-in any empty fields of the network flow data.

19. The method of claim 18, further comprising, after completing the network flow data, balancing a number of samples of each class in network flow data including the network flow data.

20. The method of claim 15, wherein the network intrusion includes a botnet, denial of service (DoS), distributed DoS (DDoS), brute force, structured query language (SQL) injection, infiltration, or port scan.

* * * * *